United States Patent
Matsuo

(10) Patent No.: US 9,852,082 B2
(45) Date of Patent: Dec. 26, 2017

(54) INFORMATION PROCESSING APPARATUS AND CACHE CONTROL METHOD

(71) Applicant: FUJITSU LIMITED, Kawasaki-shi, Kanagawa (JP)

(72) Inventor: Yuki Matsuo, Bunkyo (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/262,320

(22) Filed: Sep. 12, 2016

(65) Prior Publication Data

US 2017/0103023 A1   Apr. 13, 2017

(30) Foreign Application Priority Data

Oct. 7, 2015   (JP) ................................. 2015-199320

(51) Int. Cl.
| | | |
|---|---|---|
| G06F 12/08 | (2016.01) | |
| G06F 12/123 | (2016.01) | |
| G06F 12/0862 | (2016.01) | |
| G06F 12/0891 | (2016.01) | |

(52) U.S. Cl.
CPC ........ *G06F 12/123* (2013.01); *G06F 12/0862* (2013.01); *G06F 12/0891* (2013.01); *G06F 2212/602* (2013.01); *G06F 2212/69* (2013.01)

(58) Field of Classification Search
CPC . G06F 12/123; G06F 12/0862; G06F 12/0891
USPC ................. 711/136, 159, 160, 213
See application file for complete search history.

(56) References Cited

U.S. PATENT DOCUMENTS

| | | | | |
|---|---|---|---|---|
| 5,432,918 A | * | 7/1995 | Stamm .................. | G06F 9/3836 710/112 |
| 5,761,706 A | * | 6/1998 | Kessler ............... | G06F 12/0862 711/118 |
| 6,081,783 A | * | 6/2000 | Divine .................... | H03M 7/30 704/201 |
| 6,154,826 A | * | 11/2000 | Wulf ..................... | G06F 8/4442 711/167 |
| 6,263,396 B1 | * | 7/2001 | Cottle ...................... | G09G 5/14 348/E11.021 |
| 6,560,676 B1 | | 5/2003 | Nishimoto et al. | |
| 7,360,015 B2 | * | 4/2008 | Matthews ........... | G06F 12/0866 711/113 |

(Continued)

FOREIGN PATENT DOCUMENTS

| | | |
|---|---|---|
| JP | 63-318654 | 12/1988 |
| JP | 9-212421 | 8/1997 |
| JP | 2001-195304 | 7/2001 |

*Primary Examiner* — Stephen Elmore
(74) *Attorney, Agent, or Firm* — Fujitsu Patent Center

(57) ABSTRACT

A processor generates stream information indicating a stream of access on the basis of the positional relationship on a storage device among a plurality of accessed first data blocks. The processor associates sequence information representing the positional relationship on the storage device with a plurality of second data blocks prefetched in a memory on the basis of the stream information. When a certain second data block is accessed, the processor searches for another second data block that is determined to be earlier in the order of access made by the stream than the certain second data block, on the basis of the sequence information. The processor removes the found second data block from the memory.

6 Claims, 17 Drawing Sheets

(56) References Cited

U.S. PATENT DOCUMENTS

| | | | | |
|---|---|---|---|---|
| 7,529,245 B1* | 5/2009 | Muller | ................... | H04L 49/90 |
| | | | | 370/394 |
| 7,921,275 B2* | 4/2011 | Arimilli | .............. | G06F 9/30032 |
| | | | | 711/137 |
| 8,255,631 B2* | 8/2012 | Chen | ....................... | G06F 9/383 |
| | | | | 711/137 |
| 8,266,383 B1* | 9/2012 | Minkin | ................ | G06F 12/084 |
| | | | | 710/39 |
| 9,104,599 B2* | 8/2015 | Atkisson | ............... | G06F 11/108 |
| 9,224,187 B2* | 12/2015 | Cote | ......................... | G06T 1/60 |
| 9,722,884 B2* | 8/2017 | Newton | ............... | H04L 65/403 |
| 2017/0103024 A1* | 4/2017 | Matsuo | ................ | G06F 12/123 |

\* cited by examiner (A) ACCESS TO
CONTINUOUS AREAS (B) ACCESS TO
INTERMITTENT AREAS MANAGEMENT STRUCTURE  131a

| STREAM FLAG | ON |
|---|---|
| STREAM ID | S1 |
| SEQUENCE ID | SQ1 |
| CACHE ADDRESS | 0xFF0100 |
| DISK ADDRESS | 0xFF000300 |

FIG. 8

SEQUENCE ID TABLE ⸺ 133

| STREAM ID | SEQUENCE ID |
|---|---|
| S1 | SQ3 |
| S2 | SQ1 |
| S3 | SQ2 |

FIG. 10

STREAM TABLE 136a

| USE FLAG | ON |
|---|---|
| STREAM ID | S1 |
| ACCESS ADDRESS ($A_{last}$) | 0xFF0003FF |
| PREFETCH ADDRESS ($A_{pre}$) | 0xFF0004FF |
| SEQUENCE COUNTER (C) | 2 |

FIG. 12

INFORMATION PROCESSING APPARATUS AND CACHE CONTROL METHOD

CROSS-REFERENCE TO RELATED APPLICATION

This application is based upon and claims the benefit of priority of the prior Japanese Patent Application No. 2015-199320, filed on Oct. 7, 2015, the entire contents of which are incorporated herein by reference.

FIELD

The embodiments discussed herein relate to an information processing apparatus and a cache control method.

BACKGROUND

In information processing systems, relatively slow storage devices (for example, auxiliary storage devices, such as Hard Disk Drives (HDD) and Solid State Drives (SSD)), are often used to store a large amount of data. If such a slow storage device is accessed each time an access request is issued, the data access becomes a bottleneck for performance. To deal with this, part of data stored in the slow storage device may be cached in a relatively fast memory (for example, a main storage device, such as a Random Access Memory (RAM)). The data cached in the memory may be supplied without access to the original storage device.

For example, there is considered a case of caching data that has a high possibility of being used, in a memory. In addition, for example, there is considered another case of keep holding used data in a memory, considering localization of access, which characterizes that data has a high possibility of being used again once the data is used. In this connection, in many cases, a memory used to cache data has less capacity than an original storage device, and therefore replacement of cached data occurs. As a method for selecting data to be removed from a memory, a Least Recently Used (LRU) algorithm or another page replacement algorithm is used. The LRU algorithm is to preferentially remove data that has been used the least recently (data that has not been used for the longest time).

By the way, data access includes data access with sequentiality, that is, sequential access to continuous areas on an original storage device and access to areas at fixed intervals. In the case where data access with sequentiality is detected, data to be requested next may be predicted and prefetched in a memory without waiting for further access requests. The prefetching achieves accelerated data access even to data that is not used repeatedly in a short time.

Note that there has been proposed a replacement determination circuit for determining a data block to be removed, from among a plurality of data blocks prefetched in a buffer. When having selected two or more candidate data blocks to be removed by the LRU algorithm, this proposed replacement determination circuit preferentially removes a data block that has not been accessed even once from the buffer, from among the selected candidates to be removed.

Further, there has been proposed a data processing apparatus having a cache control unit for prefetching data to be used by a processor, in a cache memory, independently of the processor. The cache control unit preferentially removes data used by the processor from among the data stored in the cache memory. Still further, there has been proposed a cache storage device that limits storage areas for prefetching among a plurality of storage areas. When prefetching new data, the proposed cache storage device removes data from a storage area used for prefetching, and does not remove any data from storage areas that are not used for prefetching.

Please see, for example, Japanese Laid-open Patent Publication Nos. 63-318654, 9-212421, and 2001-195304.

In many cases, data access with sequentiality is to request data over a wide area, and therefore data is prefetched in a memory one by one while the data access with sequentiality continues. In addition, in the data access with sequentiality, data in a plurality of areas in a storage device is requested only in one direction, and this direction does not change. For example, in the case of requesting data in a plurality of areas of a storage device in ascending order of addresses, there is a low possibility that the order is changed such that, after data in a certain area is requested, data in an area with a smaller address than the certain area is requested. As the data access with sequentiality progresses, part of data prefetched in a memory has a lower possibility of being used.

If a general page replacement algorithm is employed for all prefetched data and the other data, the other data that has a possibility of being used may be removed from a memory, earlier than prefetched data that has a low possibility of being used thereafter. This may reduce the use efficiency of the memory for caching, which is a problem. If storage areas for prefetching and the other storage areas are independently provided, as taught in Japanese Laid-open Patent Publication No. 2001-195304, such a situation may occur that one of these two kinds of areas has free space and the other is full, which may reduce the use efficiency of the memory for caching.

SUMMARY

According to one aspect, there is provided an information processing apparatus including: a memory that caches therein data blocks stored in a storage device; and a processor that performs a process including detecting a stream of access satisfying prescribed regularity conditions, based on a positional relationship on the storage device among a plurality of first data blocks accessed, generating stream information indicating the stream, associating sequence information with each of a plurality of second data blocks prefetched based on the stream information from the storage device to the memory, the sequence information representing a positional relationship on the storage device among the plurality of second data blocks, searching, when one of the plurality of second data blocks is accessed, the plurality of second data blocks for one or more other second data blocks that are determined to be earlier in an order of access made by the stream than the one second data block, based on the sequence information, and removing the one or more other second data blocks from the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of a management structure;

FIG. 10 illustrates an example of a sequence ID table;

FIG. 12 illustrates an example of a stream table;

DESCRIPTION OF EMBODIMENTS

Figure 1:
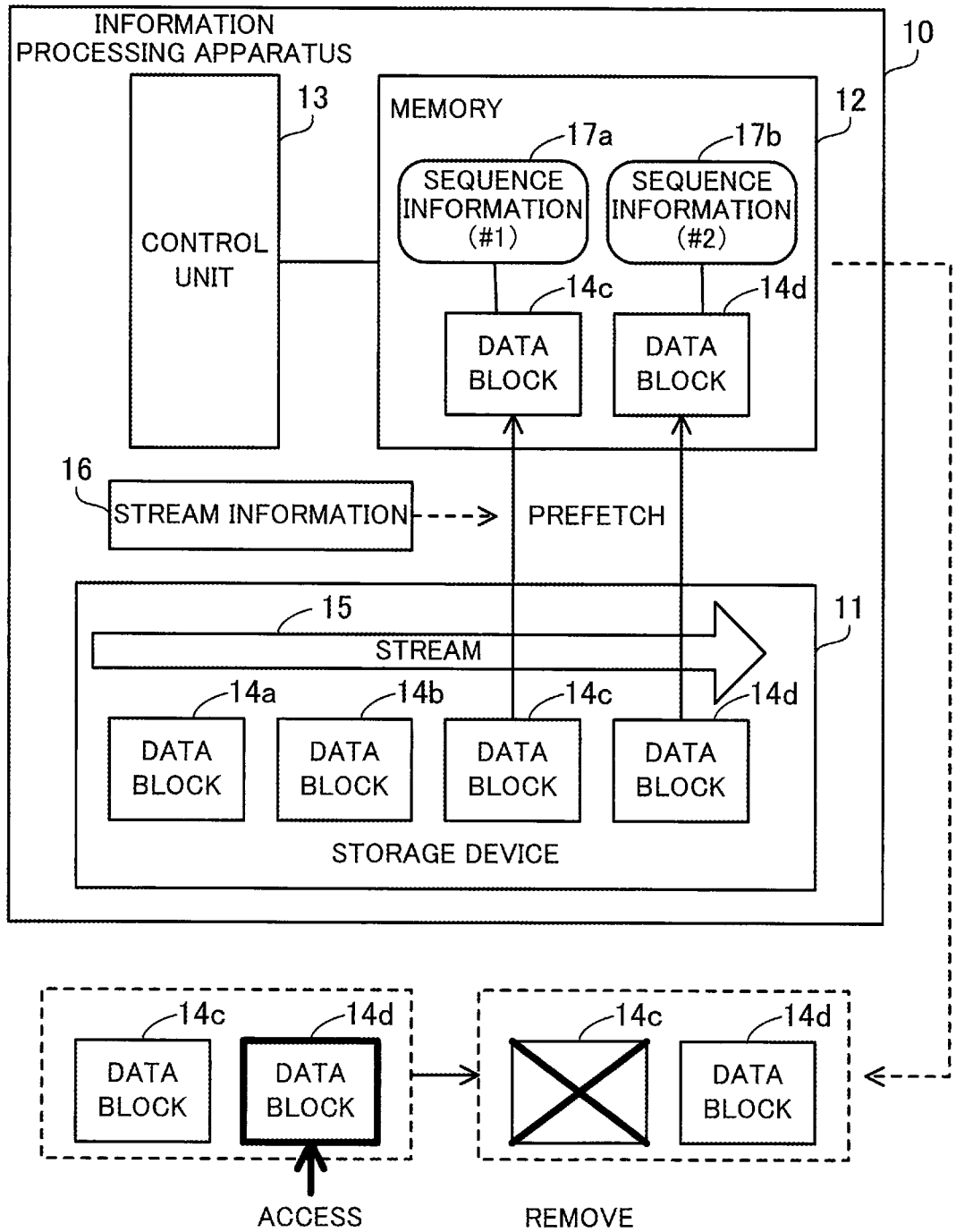
FIG. 1 illustrates an example of an information processing apparatus according to a first embodiment.

Several embodiments will be described below with reference to the accompanying drawings, wherein like reference numerals refer to like elements throughout.

First Embodiment

A first embodiment will be described.

FIG. 1 illustrates an example of an information processing apparatus according to the first embodiment.

An information processing apparatus 10 of the first embodiment makes data access in response to requests from a process executed by the information processing apparatus 10 or a process executed by another information processing apparatus. The data access includes access for data read operations and data write operations. The information processing apparatus 10 may be a server apparatus, such as a server computer, or a client apparatus, such as a client computer. Alternatively, the information processing apparatus 10 may be a storage apparatus.

The information processing apparatus 10 includes a storage device 11, a memory 12, and a control unit 13. In this connection, the storage device 11 may be provided outside the information processing apparatus 10 if the storage device 11 is accessible to the information processing apparatus 10. The storage device 11 has relatively slow access times. For example, the storage device 11 is a non-volatile storage device, such as an HDD or SSD. The memory 12 has faster access times than the storage device 11. For example, the memory 12 is a volatile semiconductor memory, such as a RAM. The memory 12 has less storage capacity than the storage device 11.

The control unit 13 is a Central Processing Unit (CPU), a Digital Signal Processor (DSP), or another processor, for example. In this connection, the control unit 13 may include an Application Specific Integrated Circuit (ASIC), a Field Programmable Gate Array (FPGA), or another application specific electronic circuit. The processor executes programs stored in a RAM or another memory. The program includes a cache control program. A set of a plurality of processors (multiprocessor) may be called a "processor".

The storage device 11 stores therein a plurality of data blocks including data blocks 14a, 14b, 14c, and 14d. Each data block is a unit of data to be loaded from the storage device 11 to the memory 12, and for example, has a predetermined data size. A data block may be called a page or segment. The locations of the data blocks 14a, 14b, 14c, and 14d may be specified by using physical addresses of the storage device 11.

The data blocks 14a, 14b, 14c, and 14d are arranged in ascending or descending order of physical addresses. For example, the data block 14b has a higher physical address than the data block 14a, and the data block 14c has a higher physical address than the data block 14b. The data block 14d has a higher physical address than the data block 14c. Areas where the data blocks 14a, 14b, 14c, and 14d are located may be adjacent to each other or may be separated one from another by a threshold distance or less in the storage device 11.

The memory 12 caches therein some of a plurality of data blocks stored in the storage device 11. In the case where a data block that has not been cached is requested while areas of the memory 12 used for caching is full, one or more data blocks stored in the memory 12 are removed from the memory 12. To select which data blocks to remove, a prescribed page replacement algorithm, such as an LRU algorithm, is used. The LRU algorithm is to preferentially remove a data block that has been used the least recently in the memory 12 (a data block that has not been used for the longest time). Note that, as will be described later, there are cases where data blocks that satisfy prescribed conditions are removed more preferentially than data blocks selected by the general page replacement algorithm.

The control unit 13 detects a stream 15 of access satisfying prescribed regularity conditions, with respect to two or more data blocks (first data blocks) loaded to and accessed in the memory 12, on the basis of the positional relationship on the storage device 11 among these data blocks. For example, the stream 15 is a sequence of access to two or more data blocks in ascending or descending order of physical addresses and two successively accessed data blocks of the stream 15 have a threshold distance or less therebetween. The stream 15 may be said to be data access with sequentiality.

For example, in the case where the data block 14a is accessed and then the data block 14b is accessed, a stream 15 indicating access to two or more data blocks in the vicinity of the data block 14a in ascending order of physical addresses is detected. The control unit 13 generates stream information 16 indicating the detected stream 15. The stream information 16 may be stored in the memory 12. The stream information 16 includes, for example, identification information of the stream 15, the physical address of a data block accessed last by the stream 15, and others.

The control unit 13 prefetches two or more data blocks (second data blocks) from the storage device 11 to the memory 12 on the basis of the generated stream information 16, without waiting for further requests. For example, the control unit 13 prefetches, to the memory 12, data blocks that have higher physical addresses than the data block accessed last by the stream 15 and have a threshold distance or less from the data block accessed last. As an example, the control unit 13 prefetches the data blocks 14c and 14d from the storage device 11 to the memory 12.

In addition, the control unit 13 associates sequence information representing the positional relationship on the storage device 11 among the prefetched data blocks with each of the prefetched data blocks. The sequence information may be physical addresses of the storage device 11 or sequence numbers that are different from the physical addresses. The sequence numbers may be serial numbers that are assigned to prefetched data blocks in ascending or descending order of physical addresses. For example, the control unit 13 associates sequence information 17a with the data block 14c, and sequence information 17b with the data block 14d. The sequence information 17a and 17b may be stored in the memory 12.

When one of data blocks prefetched in the memory 12 is accessed, the control unit 13 searches for a data block which is determined to be earlier in the order of access made by the stream 15 than the accessed data block on the basis of the sequence information. For example, in the case where increasing sequence numbers are used as the sequence information, the control unit searches for a data block with a smaller sequence number than the accessed data block from the data blocks stored in the memory 12. On the other hand, in the case where decreasing sequence numbers are used as the sequence information, for example, the control unit 13 searches for a data block with a higher sequence number than the accessed data block from the data blocks stored in the memory 12.

As an example, in the case where the data block 14d is accessed, the control unit 13 finds the data block 14c on the basis of the sequence information 17a and 17b. The data block 14c has a physical address in a reverse direction to the travel direction of the stream 15, viewing from the data block 14d. It may be said that the data block 14c was predicted to be accessed earlier than the data block 14d at the time of prefetching and the data block 14c has already been passed over by the stream 15. In this connection, the data block 14c may or may not have been accessed in the memory 12. This is because the stream 15 may skip access to the data block 14c, contrary to the prefetching.

Then, the control unit 13 removes the found data block from the memory 12. The found data block is removed more preferentially than a data block selected by the general page replacement algorithm. A data block already passed over by the stream 15 may be removed from the memory 12 when the data block is found or when replacement of a cached data bock is performed. As an example, the control unit 13 removes the found data block 14c from the memory 12 more preferentially than other data blocks when the areas of the memory 12 used for caching get short of capacity.

As described above, the information processing apparatus 10 of the first embodiment associates the sequence information 17a and 17b representing the positional relationship on the storage device 11 with the data blocks 14c and 14d prefetched based on the stream information 16 indicating the stream 15. In the case where the data block 14d is accessed, the data bock 14c that is determined to be earlier in the order of access made by the stream 15 than the data block 14d is found on the basis of the sequence information 17a and 17b and is removed from the memory 12.

The stream 15 makes access to two or more data blocks in a fixed direction (ascending or descending order of physical addresses in the storage device 11), and the direction rarely changes. Therefore, after the data block 14d is accessed, there is a low possibility that the data block 14c already passed over by the stream 15 is accessed. By preferentially removing the data block 14c with a low possibility of being accessed from the memory 12, a free area always exists in the memory 12. This prevents other data blocks that are possibly accessed from being removed earlier than the data block 14c, thereby improving the use efficiency of the areas of the memory 12 used for caching.

Second Embodiment

A second embodiment will now be described.

Figure 2:
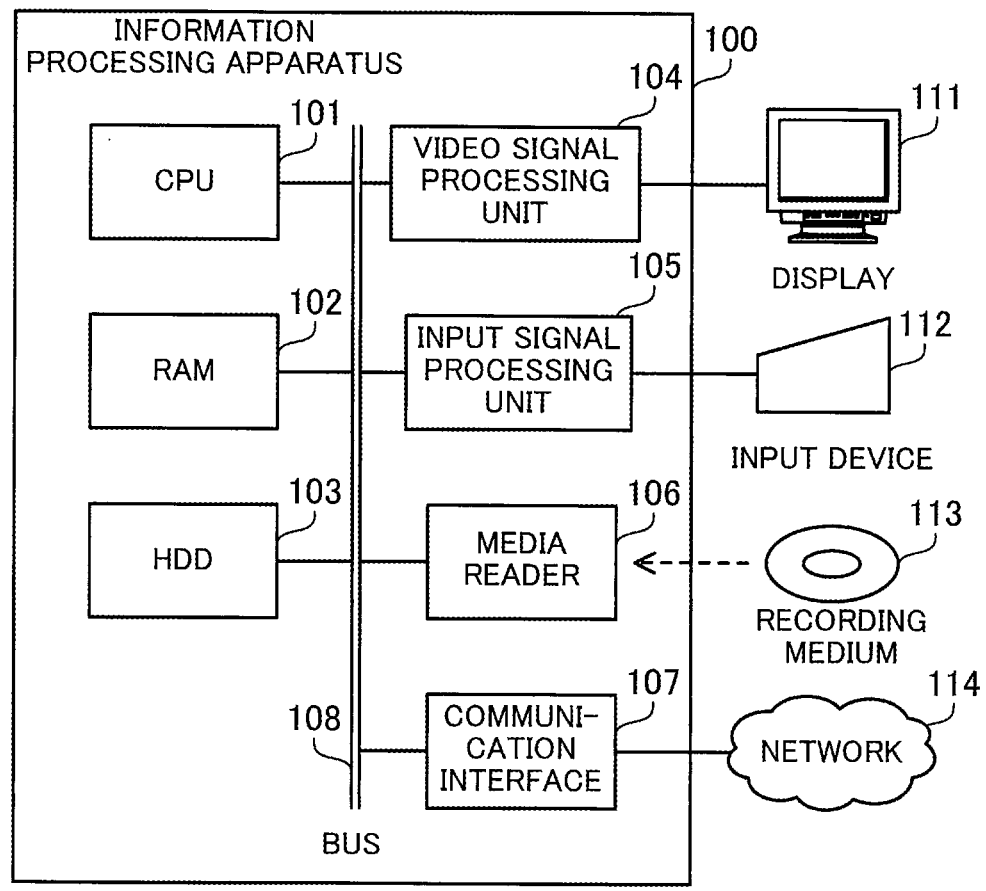
FIG. 2 is a block diagram illustrating an example of a hardware configuration of an information processing apparatus.

FIG. 2 is a block diagram illustrating an example of a hardware configuration of an information processing apparatus.

The information processing apparatus 100 includes a CPU 101, a RAM 102, an HDD 103, a video signal processing unit 104, an input signal processing unit 105, a media reader 106, and a communication interface 107. These CPU 101, RAM 102, HDD 103, video signal processing unit 104, input signal processing unit 105, media reader 106, and communication interface 107 are connected to a bus 108. In this connection, the information processing apparatus 100 corresponds to the information processing apparatus 10 of the first embodiment. The CPU 101 corresponds to the control unit 13 of the first embodiment. The RAM 102 corresponds to the memory 12 of the first embodiment. The HDD 103 corresponds to the storage device 11 of the first embodiment. The information processing apparatus 100 may be a client apparatus, such as a client computer, or a server apparatus, such as a server computer.

The CPU 101 is a processor including a computational circuit that executes program instructions. The CPU 101 loads at least part of a program and data from the HDD 103 to the RAM 102 and then executes the program. The CPU 101 may be provided with a plurality of processor cores, and the information processing apparatus 100 may be provided with a plurality of processors. The processes that will be described below may be performed in parallel with a plurality of processors or processor cores. A set of a plurality of processors (multiprocessor) may be called a "processor".

The RAM 102 is a volatile semiconductor memory for temporarily storing therein a program to be executed by the CPU 101 and data to be used by the CPU 101 in processing. In this connection, the information processing apparatus 100 may be provided with another kind of memory than RAM or a plurality of memories.

The HDD 103 is a non-volatile storage device for storing therein software programs, such as Operating System (OS), middleware, or application software, and data. The programs include a cache control program. In this connection, the information processing apparatus 100 may be provided with another kind of storage device, such as a flash memory or SSD, or a plurality of non-volatile storage devices.

The video signal processing unit 104 outputs images to a display 111 connected to the information processing apparatus 100 in accordance with instructions from the CPU 101. As the display 111, a Cathode Ray Tube (CRT) display, a Liquid Crystal Display (LCD), a Plasma Display, an Organic Electro-Luminescence (OEL) display, or another may be used.

The input signal processing unit 105 obtains input signals from an input device 112 connected to the information processing apparatus 100 and outputs the input signals to the CPU 101. As the input device 112, a pointing device, such as a mouse, a touch panel, a touch pad, or a track ball, a keyboard, a remote controller, a button switch, or another may be used. In addition, plural kinds of input devices may be connected to the information processing apparatus 100.

The media reader 106 reads programs and data from a recording medium 113. As the recording medium 113, a magnetic disk, such as a Flexible Disk (FD) or HDD, an optical disc, such as a Compact Disc (CD) or Digital Versatile Disc (DVD), a Magneto-Optical (MO) disk, a semiconductor memory, or another may be used. The media reader 106 stores programs and data read from the recording medium 113 in the RAM 102 or HDD 103, for example.

The communication interface 107 is connected to a network 114 to achieve communication with another apparatus over the network 114. The communication interface 107 may be a wired communication interface, which is connected to a switch or another communication device via a cable, or a wireless communication interface, which is connected to a base station via a wireless link.

The following describes how to cache data stored in the HDD 103 to the RAM 102.

Figure 3:
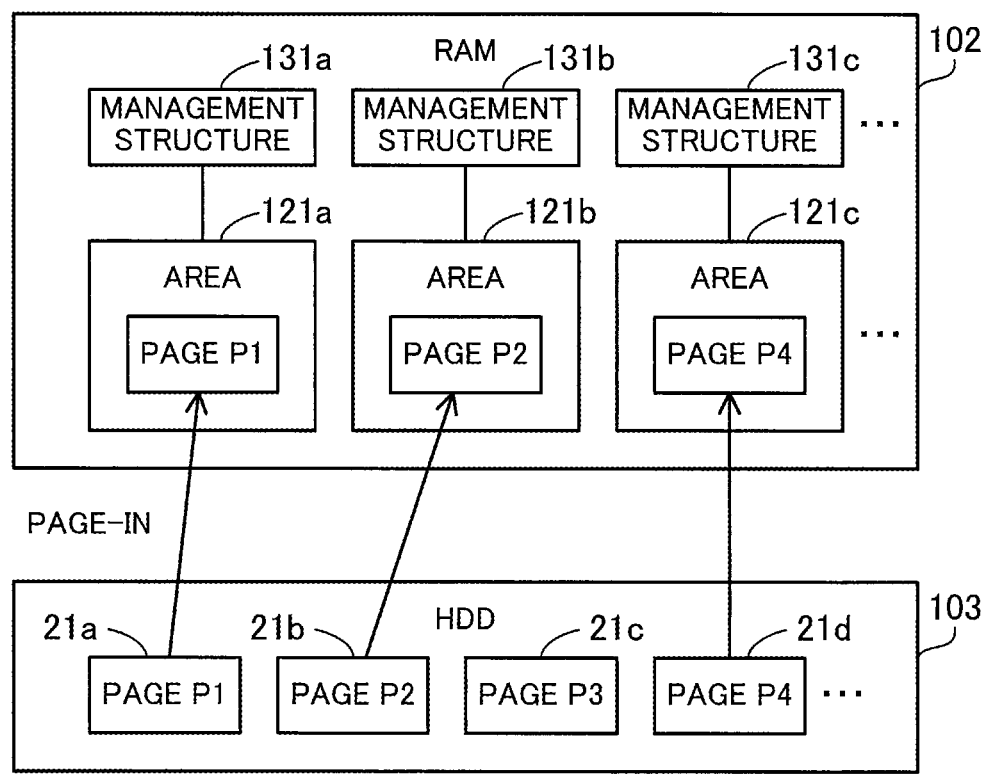
FIG. 3 illustrates an example of page management for a cache.

FIG. 3 illustrates an example of page management for a cache.

The information processing apparatus 100 reads or writes data in response to access requests issued from a process executed by the information processing apparatus 100 or another information processing apparatus. In this connection, data cached in the RAM 102 is processed in response to the access requests. In the case where data specified by an access request has not been cached in the RAM 102, the information processing apparatus 100 loads the specified data from the HDD 103 to the RAM 102. The data is loaded from the HDD 103 to the RAM 102 on a page-by-page basis. Each page has a predetermined size.

In the RAM 102, a plurality of areas each for storing a single page are created in advance. For each of the areas, a management structure for managing a page stored in the area is generated and stored in advance in the RAM 102. The plurality of areas include areas 121*a*, 121*b*, and 121*c*. The RAM 102 stores therein a management structure 131*a* corresponding to the area 121*a*, a management structure 131*b* corresponding to the area 121*b*, and a management structure 131*c* corresponding to the area 121*c*. The HDD 103 stores therein a plurality of pages including pages 21*a* (P1), page 21*b* (P2), page 21*c* (P3), and page 21*d* (P4).

When an access request specifying a physical address belonging to the page 21*a* arrives, for example, the information processing apparatus 100 loads the page 21*a* from the HDD 103 to the area 121*a* (page-in). At this time, the information processing apparatus 100 updates the management structure 131*a*. When an access request specifying a physical address belonging to the page 21*b* arrives, for example, the information processing apparatus 100 loads the page 21*b* from the HDD 103 to the area 121*b*. At this time, the information processing apparatus 100 updates the management structure 131*b*. When an access request specifying a physical address belonging to the page 21*d* arrives, for example, the information processing apparatus 100 loads the page 21*d* from the HDD 103 to the area 121*c*. At this time, the information processing apparatus 100 updates the management structure 131*c*.

Figure 4:
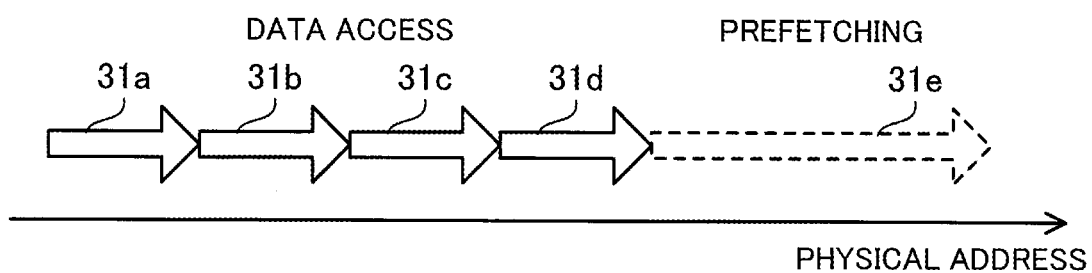
FIG. 4 illustrates examples of data access with sequentiality and prefetching.
Figure 4:
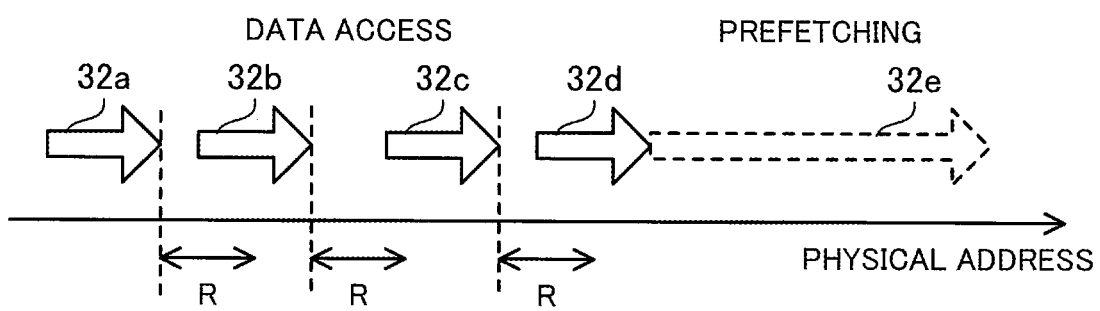

FIG. 4 illustrates examples of data access with sequentiality and prefetching.

Data access made in one process includes sporadic data access to pages separated from each other on the HDD 103 and data access with sequentiality to pages adjacent to each other on the HDD 103. In the second embodiment, consider the case of requesting a plurality of pages in ascending order of physical addresses in the HDD 103, as data access with sequentiality. A set of data access with sequentiality may be called a "stream".

The data access with sequentiality includes (A) access to continuous areas and (B) access to intermittent areas. The continuous-area access is to request, after requesting a certain page, a page with a higher physical address next to the certain page. By successively requesting pages, a page and then its next page, in a plurality of access requests, a series of continuous areas is requested. The intermittent-area access is to request, after requesting a certain page, a page which has a higher physical address than the certain page and is separated from the end of the certain page by less than a threshold distance R.

For example, in the continuous-area access, data access 31*a* requesting a certain page is made. Then, data access 31*b* requesting a page next to the page requested by the data access 31*a* is made. Similarly, data access 31*c* requesting a page next to the page requested by the data access 31*b* is made. Data access 31*d* requesting a page next to the page requested by the data access 31*c* is made. The data access 31*a*, 31*b*, 31*c*, and 31*d* belong to a single stream.

In the intermittent-area access, for example, data access 32*a* requesting a certain page is made. Next, data access 32*b* requesting a page close to the page requested by the data access 32*a* is made. The distance between the end of the page requested by the data access 32*a* and the beginning of the page requested by the data access 32*b* is less than the threshold R. Similarly, data access 32*c* requesting a page close to the page requested by the data access 32*b* is made. The distance between the end of the page requested by the data access 32*b* and the beginning of the page requested by the data access 32*c* is less than the threshold R. Data access 32*d* requesting a page close to the page requested by the data access 32*c* is made. The distance between the end of the page requested by the data access 32*c* and the beginning of the page requested by the data access 32*d* is less than the threshold R. The data access 32*a*, 32*b*, 32*c*, and 32*d* belong to a single stream, as in the case of the continuous-area access.

Note that since data access with sequentiality has a regularity, it is possible to narrow down what page may be requested next. Therefore, the information processing apparatus 100, when detecting a stream of access, prefetches pages from the HDD 103 to the RAM 102 without waiting for further access requests.

In the case of the above continuous-area access, the information processing apparatus 100 performs prefetching 31*e* after the data access 31*d*. In the prefetching 31*e*, the information processing apparatus 100 prefetches one or more pages with higher physical addresses than the page requested by the data access 31*d*, which follow the page requested by the data access 31*d*. In the case of the above intermittent-area access, the information processing apparatus 100 performs prefetching 32*e* after the data access 32*d*. In the prefetching 32*e*, the information processing apparatus 100 prefetches one or more pages with higher physical addresses than the page requested by the data access 32*d*, which exist within a prescribed distance from the end of the page requested by the data access 32*d*.

Figure 5:
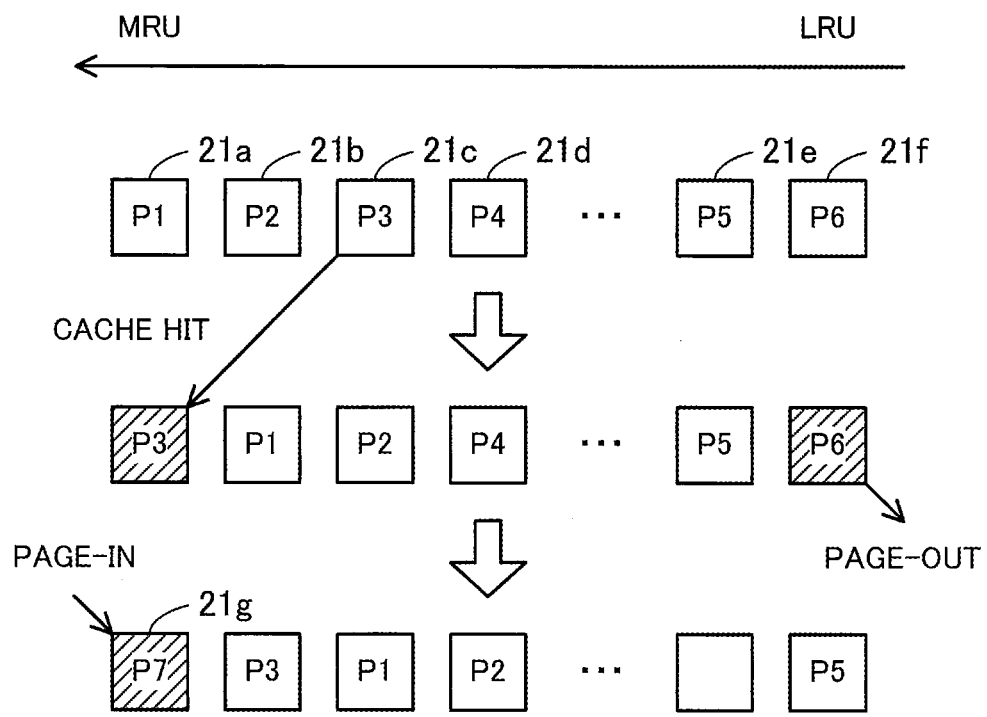
FIG. 5 illustrates an example of an LRU algorithm.

FIG. 5 illustrates an example of an LRU algorithm.

In the case where all areas in the RAM 102 store pages and another page that has not been cached is requested, the information processing apparatus 100 evicts a page from any of the areas of the RAM 102. The second embodiment employs the LRU algorithm as a page replacement algorithm for selecting a page to be evicted from among the plurality of cached pages.

The information processing apparatus 100 manages a plurality of pages stored in the RAM 102 using a list illustrated in FIG. 5, for example. A Most Recently Used (MRU) page is a page that has been used the most recently.

An LRU page is a page that has been used the least recently. In this embodiment, pages 21a, 21b, 21c, and 21d, page 21e (P5), and page 21f (P6) are registered in the list. The page 21a is listed at the top of the list, and is an MRU page. The page 21b is listed second, the page 21c is listed third, the page 21d is listed fourth, and the page 21e is listed second from the end of the list. The page 21f is listed at the end of the list and is an LRU page.

When a cached page 21c is requested (cache hit) under this situation, the page 21c is moved to the top of the list and becomes an MRU page, and the pages 21a and 21b are shifted toward the LRU side on the list accordingly. When a page 21g (P7) that has not been cached is requested (cache miss), the page 21g is added at the top of the list and becomes an MRU page, and the pages 21a, 21b, 21c, 21d, and 21e are shifted toward the LRU side on the list accordingly. In addition, the page 21f (LRU page) that has been listed at the end of the list is evicted.

As described above, with the general LRU algorithm, the page 21f is removed (paged out) from the RAM 102, and the page 21g is loaded (paged in) to the RAM 102. That is to say, the page 21f is replaced with the page 21g.

However, if the general LRU algorithm is employed for all pages loaded by prefetching and the other pages, pages that have a low possibility of being used thereafter may remain in the RAM 102, which may reduce the use efficiency of the RAM 102. That is, the order of pages requested by a stream has a regularity that is an ascending order of physical addresses, and therefore pages already passed over by the stream among the pages loaded by prefetching have a low possibility of being used. Considering this, the information processing apparatus 100 removes prefetched pages already passed over by the stream, more preferentially than pages selected by the LRU algorithm.

Figure 6:
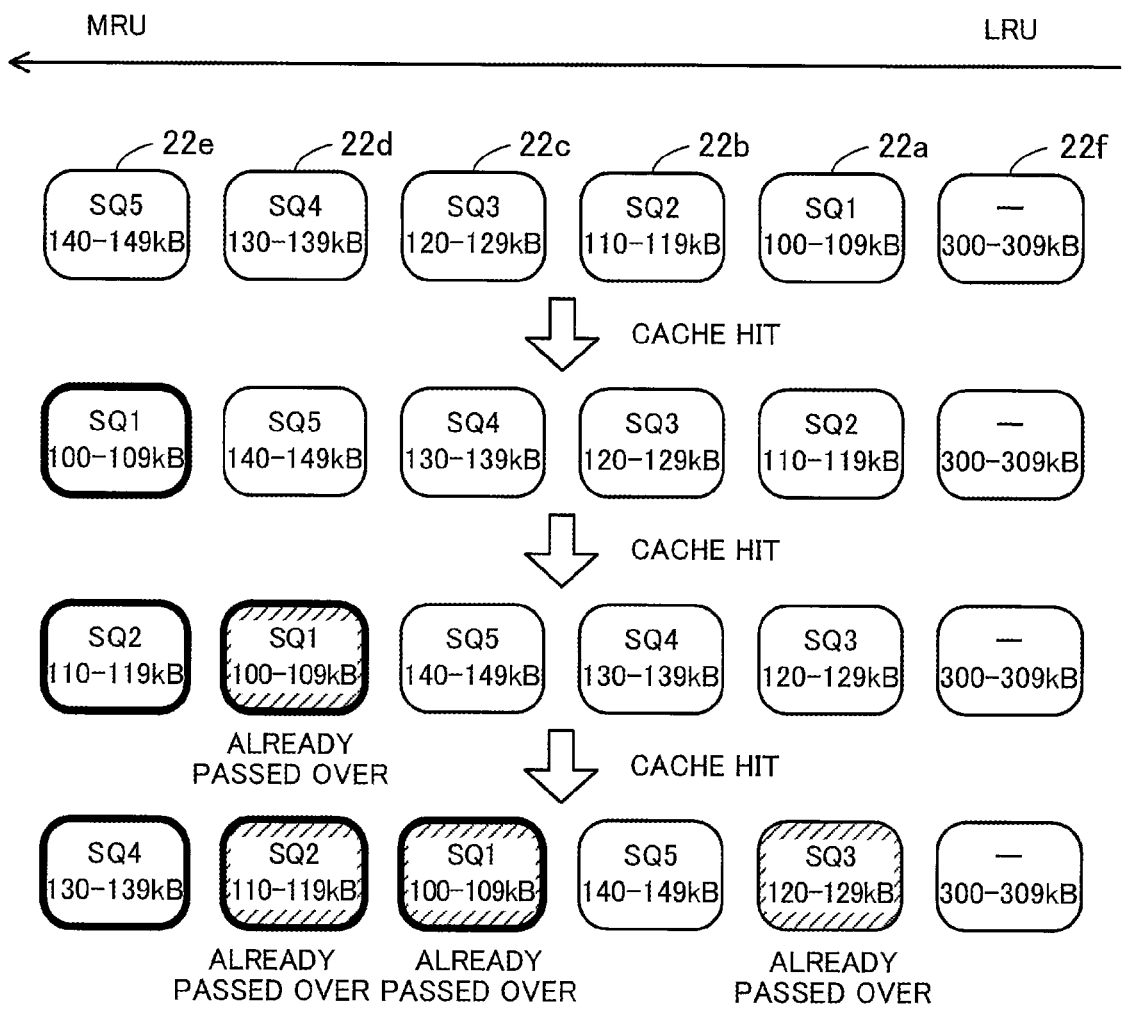
FIG. 6 illustrates an example of pages passed over by a stream.

FIG. 6 illustrates an example of pages passed over by a stream.

Assume now that each page has a size of 10 kB (kilobytes). Address ranges depicted in FIG. 6 are ranges of physical addresses of the HDD 103. First, a page 22f of 300 to 309 kB is loaded to the RAM 102 with a method other than prefetching. After that, a page 22a of 100 to 109 kB, a page 22b of 110 to 119 kB, a page 22c of 120 to 129 kB, a page 22d of 130 to 139 kB, and a page 22e of 140 to 149 kB are loaded to the RAM 102 in this order by prefetching.

The prefetched pages 22a, 22b, 22c, 22d, and 22e are given increasing sequence numbers in the order of prefetching, that is, in the order of physical addresses on the HDD 103. More specifically, the page 22a is given a sequence number "SQ1", the page 22b is given a sequence number "SQ2", the page 22c is given a sequence number "SQ3", the page 22d is given a sequence number "SQ4", and the page 22e is given a sequence number "SQ5".

When the page 22a is requested by a stream, the page 22a becomes an MRU page. At this time, there are no pages having sequence numbers smaller than the sequence number "SQ1" of the page 22a. This means that there are no pages passed over by the stream. When the page 22b is requested by the stream after that, the page 22b becomes an MRU page. At this time, the information processing apparatus 100 finds the page 22a with a sequence number smaller than the sequence number "SQ2" of the page 22b, and determines that the page 22a has already been passed over by the stream. The page 22a is able to be removed from the RAM 102 at this time.

When the page 22d is requested by the stream after that, the page 22d becomes an MRU page. At this time, the information processing apparatus 100 finds the pages 22b and 22c with sequence numbers smaller than the sequence number "SQ4" of the page 22d, and determines that the pages 22b and 22c have already been passed over by the stream. The information processing apparatus 100 determines that the page 22c, although having been prefetched in the RAM 102, is not used and is skipped by the stream. At this time, the pages 22b and 22c are able to be removed from the RAM 102.

In this connection, in the second embodiment, a page determined to have been passed over is not removed from the RAM 102 immediately, but is removed when prefetching is performed or when a cache miss occurs. In the case where pages passed over remain in the RAM 102, the pages are removed more preferentially than pages selected by the LRU algorithm. Therefore, the pages 22a, 22b, and 22c are removed more preferentially than the page 22f.

The following describes functions of the information processing apparatus 100.

Figure 7:
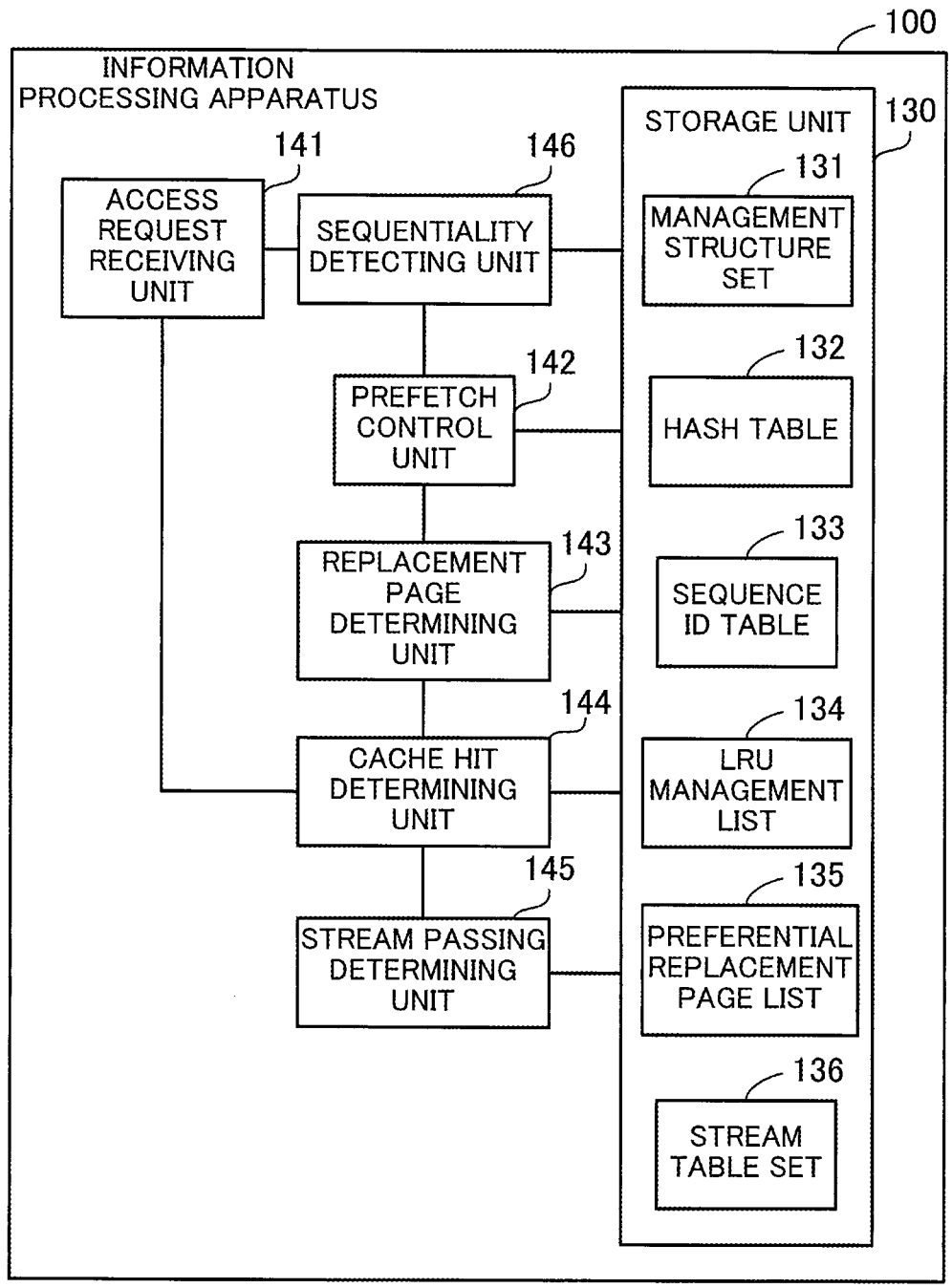
FIG. 7 is a block diagram illustrating an example of functions of the information processing apparatus.

FIG. 7 is a block diagram illustrating an example of functions of the information processing apparatus.

The information processing apparatus 100 includes a storage unit 130, an access request receiving unit 141, a prefetch control unit 142, a replacement page determining unit 143, a cache hit determining unit 144, a stream passing determining unit 145, and a sequentiality detecting unit 146. The storage unit 130 is implemented by using storage space prepared in the RAM 102 or HDD 103, for example. The access request receiving unit 141, prefetch control unit 142, replacement page determining unit 143, cache hit determining unit 144, stream passing determining unit 145, and sequentiality detecting unit 146 are implemented as program modules that are executed by the CPU 101, for example.

The storage unit 130 stores therein a management structure set 131, a hash table 132, a sequence ID table 133, an LRU management list 134, a preferential replacement page list 135, and a stream table set 136.

The management structure set 131 is a set of management structures for managing pages cached in the RAM 102. Each management structure corresponds to one area capable of storing a single page. A plurality of areas are previously prepared in the RAM 102, and the management structure set 131 is previously generated so as to correspond to these plurality of areas. The management structure set 131 includes the management structures 131a, 131b, and 131c illustrated in FIG. 3.

The hash table 132 associates the hash value of a stream ID identifying a stream with management structures used for managing pages prefetched for the stream. Using the hash table 132 makes it possible to search for management structures associated with a stream, on the basis of the stream ID of the stream with a high speed.

The sequence ID table 133 associates, with respect to a plurality of streams, the stream ID of each stream with the maximum value of sequence IDs currently used for the stream. With reference to the sequence ID table, each page prefetched for a stream is given a sequence ID.

The LRU management list 134 indicates the use state of each page cached in the RAM 102. The LRU management list 134 is used for the LRU algorithm. The LRU management list 134 indicates the order of pages (from MRU page to LRU page) as illustrated in FIG. 5. To achieve easy page management, the LRU management list 134 includes pointers each pointing to a management structure corresponding to a page. Using the LRU management list 134 makes it possible to select a page to be paged out. In this connection, in the case of employing a page replacement algorithm other than the LRU algorithm, the information processing apparatus 100 stores information based on the page replacement algorithm in the storage unit 130, instead of the LRU management list 134.

The preferential replacement page list 135 indicates candidate pages that are paged out more preferentially than pages (an LRU page) selected with reference to the LRU management list 134. Pages indicated in the preferential replacement page list 135 are pages already passed over by a stream, and have a low possibility of being used thereafter. To achieve easy page management, the preferential replacement page list 135 includes pointers each pointing to a management structure corresponding to a page.

The stream table set 136 is a set of stream tables for managing streams. One stream tale corresponds to one stream. As many stream tables as the maximum number of streams detectable by the information processing apparatus 100 are generated in advance. It is preferable that the stream table set 136 include many stream tables. For example, several thousands to ten thousand stream tables are prepared. By using the stream table set 136, a stream of access with sequentiality is detected and the detected stream is given a stream ID.

The access request receiving unit 141 receives access requests issued from an application process executed by the information processing apparatus 100 or access requests sent from another information processing apparatus. Each access request is a read request or write request. The read request includes address information indicating an area of the HDD 103 storing target data. The address information includes, for example, a beginning physical address and a data length. The write request includes data to be written and address information indicating an area of the HDD 103 for storing the target data. In the following description, a read request may mainly be considered as an access request.

The prefetch control unit 142 prefetches pages in accordance with an instruction from the sequentiality detecting unit 146. That is to say, the prefetch control unit 142 loads pages specified by the sequentiality detecting unit 146 from the HDD 103 to the RAM 102. At this time, the prefetch control unit 142 makes an inquiry about areas to store the pages to the replacement page determining unit 143. The prefetch control unit 142 overwrites the areas determined by the replacement page determining unit 143 with the pages read from the HDD 103. In addition, the prefetch control unit 142 updates the management structures corresponding to the overwritten areas so as to correspond to the prefetched pages.

The replacement page determining unit 143 determines which area to read a page into, in response to an inquiry from the prefetch control unit 142 or cache hit determining unit 144. This determination may include selecting a page to be paged out, from the pages (including prefetched pages and non-prefetched pages) cached in the RAM 102. If the preferential replacement page list 135 is not empty, the replacement page determining unit 143 preferentially selects a page from the pages listed in the preferential replacement page list 135. If the preferential replacement page list 135 is empty, the replacement page determining unit 143 selects a page in accordance with the LRU algorithm. In the latter case, the replacement page determining unit 143 refers to and updates the LRU management list 134.

The cache hit determining unit 144 provides requested data or writes data in response to an access request received by the access request receiving unit 141. If a target page has not been cached in the RAM 102, the cache hit determining unit 144 makes an inquiry about an area to store the target page, to the replacement page determining unit 143. The cache hit determining unit 144 overwrites the area determined by the replacement page determining unit 143 with the page read from the HDD 103. In addition, the cache hit determining unit 144 updates the management structure corresponding to the overwritten area so as to correspond to the stored page. If the target page has been cached in the RAM 102, on the other hand, the cache hit determining unit 144 updates the LRU management list 134 so that the target page becomes an MRU page.

Then, the cache hit determining unit 144 performs data processing on the target page in the RAM 102. If an access request is a read request, the cache hit determining unit 144 sends the requested data to the sender of the access request. If the access request is a write request, the cache hit determining unit 144 updates the requested page and sends the update result to the sender of the access request. If the target page has been prefetched and cached in the RAM 102, the cache hit determining unit 144 notifies the stream passing determining unit 145 that the page belonging to the stream has been used.

The stream passing determining unit 145 searches for pages already passed over by the stream, in response to the notification from the cache hit determining unit 144. The pages to be searched for belong to the same stream as a page used by the cache hit determining unit 144 and are prefetched pages given smaller sequence IDs than the used page. The stream passing determining unit 145 updates the preferential replacement page list 135 so as to add the found pages to the preferential replacement page list 135. This allows the pages passed over by the stream to be removed from the RAM 102 more preferentially than other pages.

The sequentiality detecting unit 146 monitors access requests received by the access request receiving unit 141. The sequentiality detecting unit 146 detects access with sequentiality, with reference to the stream table set 136, and determines a stream to which each access operation belongs. The sequentiality detecting unit 146 determines pages to be prefetched, according to the progress of the stream (with an increase in a specified physical address), and instructs the prefetch control unit 142 to perform prefetching.

FIG. 8 illustrates an example of a management structure.

The management structure set 131 includes a management structure 131a. The management structure 131a corresponds to the area 121a of the RAM 102. The management structure 131a includes the following items: stream flag, stream ID, sequence ID, cache address, and disk address.

The stream flag indicates whether a page stored in the area 121a is a page prefetched for a stream. A stream flag of "ON" (or "1") indicates that a stored page is a prefetched page for a stream. A stream flag of "OFF" (or "0") indicates that a stored page is not a prefetched page for a stream. The initial value of the stream flag is "OFF".

The stream ID indicates a stream that has caused prefetching in the case where the stream flag is "ON". In the case where the stream flag is "OFF", the stream ID may be "NULL" or "0". The sequence ID is an increasing identification number that is unique among a plurality of pages with the same stream ID. Sequence IDs are given to pages in the order of prefetching, that is, in ascending order of physical addresses on the HDD 103. In the case where the stream flag is "OFF", the sequence ID may be "NULL" or "0".

The cache address is a physical address of the RAM 102 identifying the area 121a. A cache address is the beginning physical address of the area 121a, for example. Since the management structure 131a is associated with the area 121a in advance, the cache address is determined when the management structure 131a is generated. The disk address is a physical address of the HDD 103 indicating a location where the page stored in the area 121a exists. The disk address is the beginning physical address of the page, for example. When the area 121a is overwritten with a page, the disk address of the management structure 131a is updated.

Figure 9:
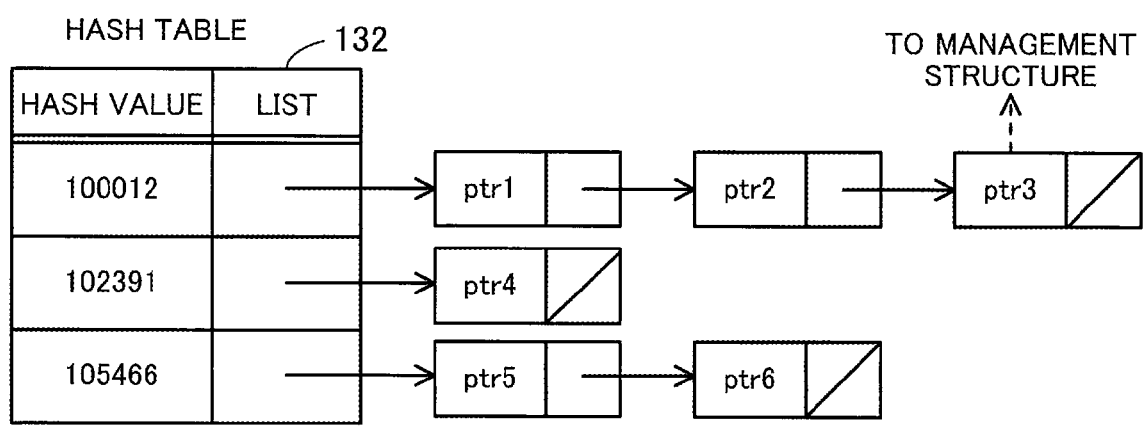
FIG. 9 illustrates an example of a hash table.

FIG. 9 illustrates an example of a hash table.

The hash table 132 includes a plurality of combinations of hash value and link to a linked list. A hash value registered in the hash table 132 is the hash value of a stream ID calculated with a predetermined hash function. A hash function used here has a sufficiently low possibility of producing an identical hash value from different stream IDs.

A linked list may be referred to on the basis of the hash value of a stream ID. The linked list links one or more pointers. Each pointer included in the linked list points to any of management structures included in the management structure set 131. As pointers, physical addresses of the RAM 102 indicating where management structures are stored may be used or structure IDs given to the management structures in advance may be used.

It may be said that the hash table 132 associates management structures including a stream ID with the stream ID. Using the hash table 132 makes it possible to search all management structures associated with a stream.

FIG. 10 illustrates an example of a sequence ID table.

The sequence ID table 133 includes a plurality of combinations of stream ID and sequence ID. Stream IDs registered in the sequence ID table 133 are given to individual streams by the sequentiality detecting unit 146. Each sequence ID registered in the sequence ID table 133 is the maximum value of the sequence IDs (sequence IDs included in management structures) currently used for the stream identified by the stream ID. A sequence ID to be given to a page prefetched next is a sequence ID greater by one than that registered in the sequence ID table 133. The minimum value of sequence IDs given is "1", and the initial value of the sequence IDs in the sequence ID table 133 is "0".

Figure 11:
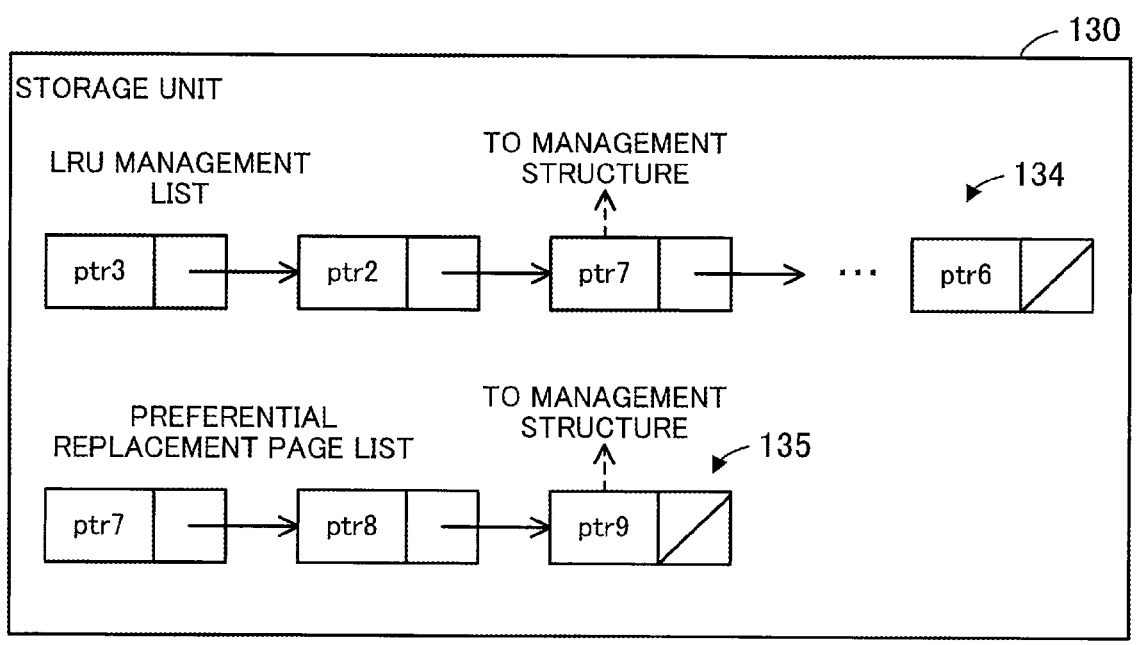
FIG. 11 illustrates an example of an LRU management list and preferential replacement page list.

FIG. 11 illustrates an example of an LRU management list and preferential replacement page list.

The LRU management list 134 is a linked list linking a plurality of pointers each pointing to a management structure. As described earlier, physical addresses identifying where management structures are stored or structure IDs given to management structures in advance may be used as the pointers. The top pointer on the LRU management list points to a management structure corresponding to an MRU page. The end pointer on the LRU management list points to a management structure corresponding to an LRU page.

When a page hit to a certain page occurs, a pointer pointing to the management structure corresponding to the page moves to the top of the LRU management list 134. When a certain page is paged out, this means that another page is read into the same area, and therefore a pointer pointing to the management structure corresponding to the page moves to the top of the LRU management list 134. In the case where a page to be removed is selected with the LRU algorithm, a page corresponding to the management structure pointed to by the pointer at the end of the LRU management list 134 is selected.

The preferential replacement page list 135 is a linked list linking one or more pointers each pointing to a management structure. As described earlier, physical addresses identifying where management structures are stored or structure IDs given to management structures in advance may be used as the pointers. Pages corresponding to the management structures pointed to by the pointers are pages determined to have been passed over by a stream by the stream passing determining unit 145.

When a page passed over by a stream is detected, a pointer pointing to the management structure corresponding to the detected page is added to the end of the preferential replacement page list 135. When a page passed over by the stream is removed from the RAM 102, a pointer pointing to the management structure corresponding to the removed page is removed from the preferential replacement page list 135. In the case where the preferential replacement page list 135 includes a plurality of pointers, these pointers may be selected in a desired order. For example, the pointers are selected in order from the top pointer.

FIG. 12 illustrates an example of a stream table.

A stream table set 136 includes a stream table 136a. The stream table 136a includes the following items: use flag, stream ID, access address ($A_{last}$), prefetch address ($A_{pre}$), and sequence counter (C).

The use flag indicates whether the stream table 136a is being used or not. The stream ID is an identification number given to a stream managed using the stream table 136a. There may be a case where a previous stream that has been managed using the stream table 136a is removed, and then the stream table 136a is used again to manage a new stream that is detected thereafter. In this case, the stream ID registered in the stream table 136a is updated to a new stream ID.

The access address indicates the end of an address range specified last by the stream managed using the stream table 136a. That is to say, the access address is a physical address of the HDD 103 indicating the end of data used last by the stream. The prefetch address is a physical address of the HDD 103 indicating the end of a page prefetched last for the stream managed using the stream table 136a.

The sequence counter indicates how many times access requests satisfying prescribed conditions have been detected. It may be said that the sequence counter indicates the number of "access operations with sequentiality" belonging to the stream managed using the stream table 136a. The prescribed conditions are that the beginning address of an address range specified by an access request exists between "$A_{last}$" and "$A_{last}$+R".

The following describes how the information processing apparatus 100 operates.

Figure 13:
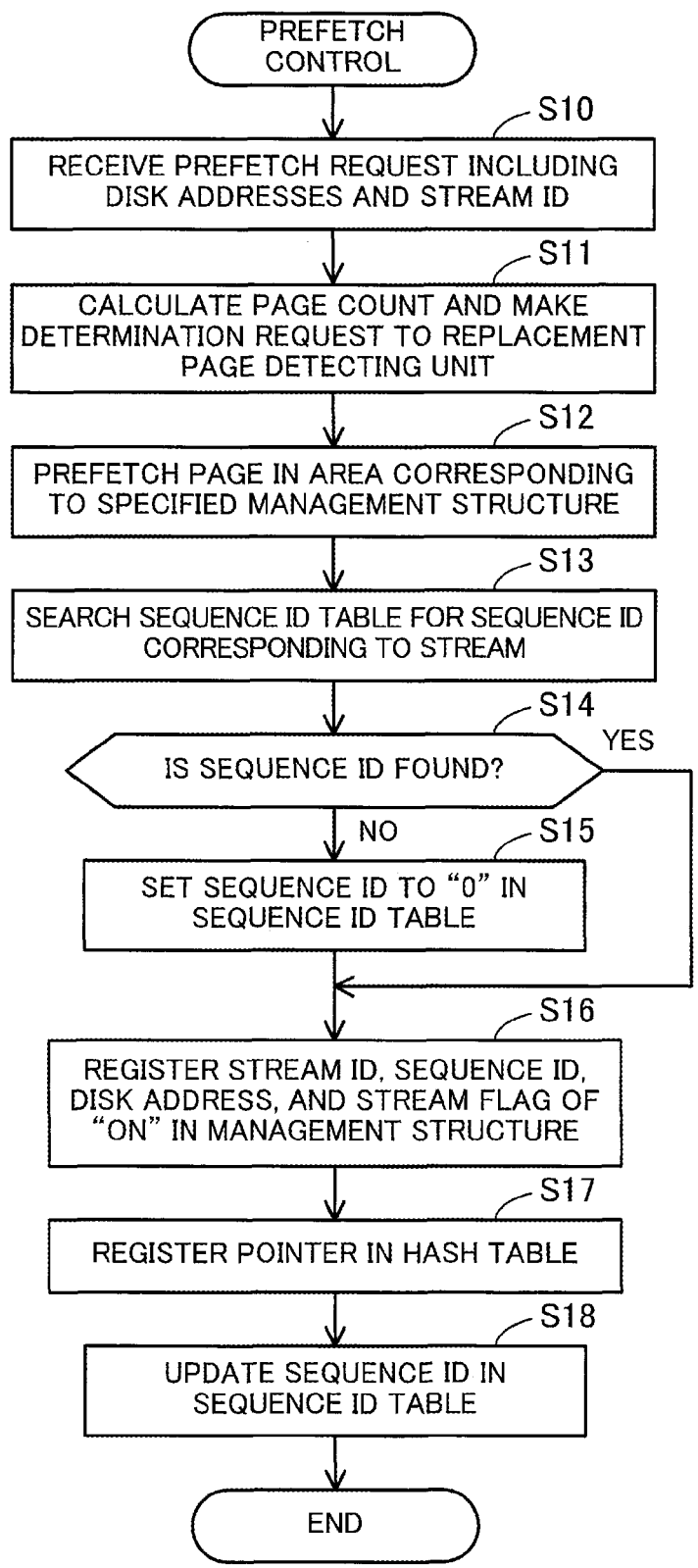
FIG. 13 is a flowchart illustrating an example of a procedure of prefetch control.

FIG. 13 is a flowchart illustrating an example of a procedure of prefetch control.

(S10) The prefetch control unit 142 receives a prefetch request from the sequentiality detecting unit 146. The prefetch request includes disk addresses indicating the beginnings and ends of one or more pages to be prefetched and a stream ID.

(S11) The prefetch control unit 142 calculates a page count indicating how many pages to prefetch, on the basis of the disk addresses included in the prefetch request. The prefetch control unit 142 makes a determination request including the page count to the replacement page determining unit 143.

(S12) The prefetch control unit 142 receives pointers for as many management structures as the page count calculated at step S11, from the replacement page determining unit 143. The prefetch control unit 142 obtains cache addresses from the management structures pointed to by the received pointers. The prefetch control unit 142 copies the pages specified by the disk addresses included in the prefetch request, from the HDD 103 to the areas of the RAM 102 indicated by the cache addresses. In the case of prefetching two or more pages, the management structures may be used in a desired order.

(S13) The prefetch control unit 142 searches the sequence ID table 133 for the maximum value of the sequence IDs (the maximum value of the sequence IDs corresponding to the stream) corresponding to the stream ID included in the prefetch request.

(S14) The prefetch control unit 142 determines whether a sequence ID in question is found at step S13, that is, whether the stream ID included in the prefetch request is registered in the sequence ID table 133. If a sequence ID in question is found, the process proceeds to step S16. If a sequence ID in question is not found (the stream ID is not registered), the process proceeds to step S15.

(S15) The prefetch control unit 142 registers the stream ID included in the prefetch request, in the sequence ID table 133. In addition, the prefetch control unit 142 sets (initializes) the sequence ID corresponding to the stream ID to "0".

(S16) The prefetch control unit 142 updates the stream ID, sequence ID, disk address, and stream flag of the management structure pointed to by each pointer received at step S12. As the stream ID, the stream ID included in the prefetch request is registered in the management structure. As the sequence ID, a value calculated by adding one per management structure to the maximum value of the sequence ID found at step S13 or "0" is registered in the management structure. In the case where two or more pages have been prefetched, different sequence IDs are registered in corresponding two or more management structures. It is assumed that sequence IDs are given to prefetched pages in order from a page with the smallest disk address (normally, in the order of prefetching the pages). As the disk address, a physical address of the HDD 103 indicating the beginning of the prefetched page is registered in the management structure. As the stream flag, "ON" (or "1") is registered in the management structure.

(S17) The prefetch control unit 142 calculates the hash value of the stream ID included in the prefetch request with a prescribed hash function. The prefetch control unit 142 searches the hash table 132 for a linked list corresponding to the calculated hash value, and adds the pointers received at step S12 to the end of the linked list.

(S18) The prefetch control unit 142 searches the sequence ID table 133 for the maximum value of the sequence IDs corresponding to the stream ID included in the prefetch request. The prefetch control unit 142 updates the found maximum value. More specifically, the prefetch control unit 142 adds the page count calculated at step S11 to the found maximum value.

Figure 14:
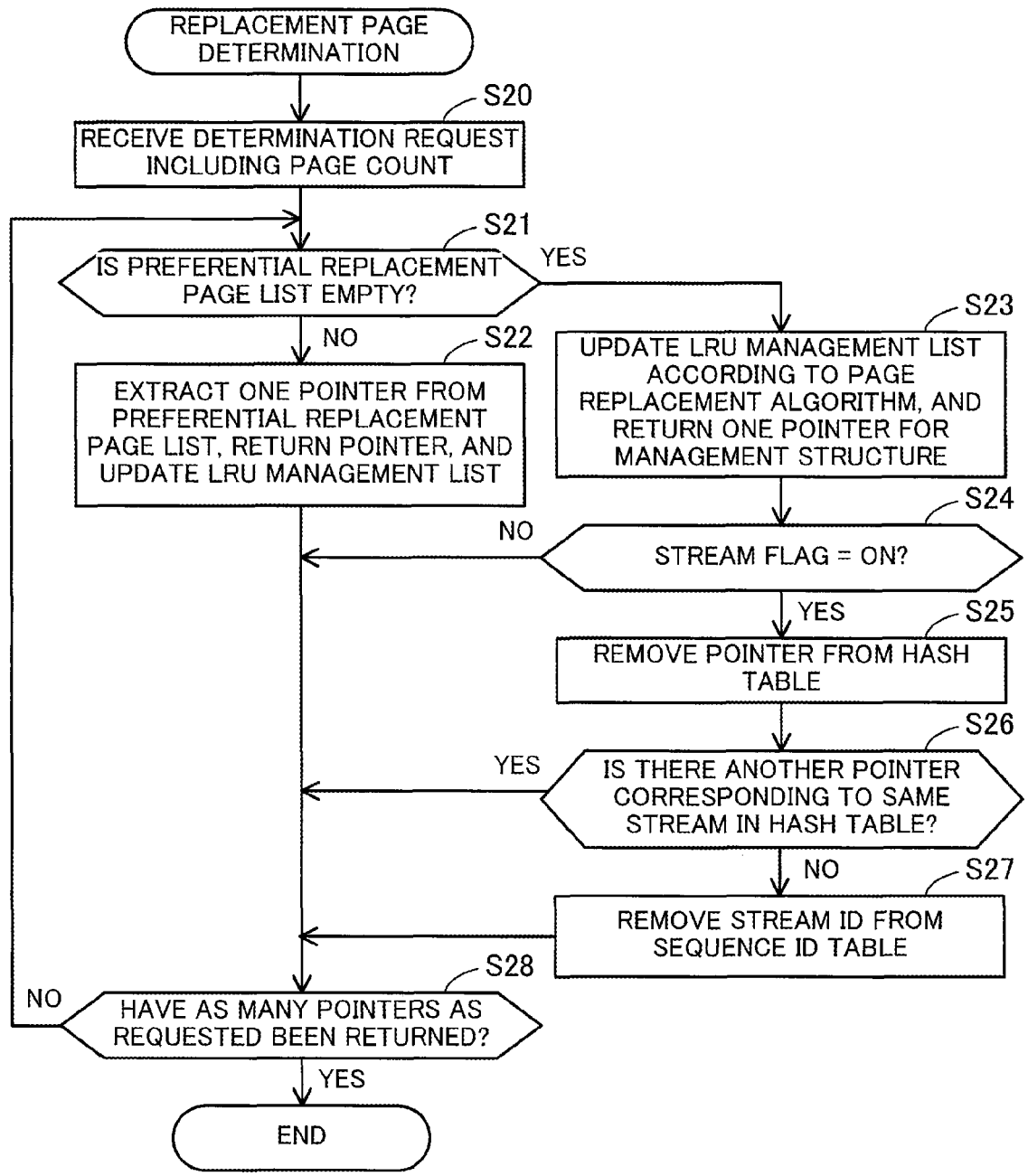
FIG. 14 is a flowchart illustrating an example of a procedure of replacement page determination.

FIG. 14 is a flowchart illustrating an example of a procedure of replacement page determination.

(S20) The replacement page determining unit 143 receives a determination request including a page count from the prefetch control unit 142 or the cache hit determining unit 144.

(S21) The replacement page determining unit 143 determines whether the preferential replacement page list 135 is empty (whether no pointer is registered). If the preferential replacement page list 135 is empty, the process proceeds to step S23. If the preferential replacement page list 135 is not empty (one or more pointers are registered), the process proceeds to step S22.

(S22) The replacement page determining unit 143 extracts one pointer (for example, the top pointer) from the preferential replacement page list 135. The extracted pointer is removed from the preferential replacement page list 135. The replacement page determining unit 143 returns the extracted pointer to the sender of the determination request. In addition, the replacement page determining unit 143 searches the LRU management list 134 for a pointer pointing to the same management structure as the extracted pointer, and removes the found pointer from the LRU management list 134. Then, the process proceeds to step S28.

(S23) The replacement page determining unit 143 updates the LRU management list 134 according to the LRU algorithm, and selects one pointer for the management structure corresponding to a page to be evicted from the RAM 102. More specifically, the replacement page determining unit 143 moves the pointer at the end of the LRU management list 134 to the top, and selects the pointer now located at the top. Alternatively, the replacement page determining unit 143 may be able to employ another page replacement algorithm. The replacement page determining unit 143 returns the selected pointer to the sender of the determination request.

(S24) The replacement page determining unit 143 obtains a stream flag from the management structure pointed to by the pointer selected at step S23, and determines whether the stream flag is "ON" (or "1"). If the stream flag is "ON", the process proceeds to step S25. If the stream flag is "OFF", the process proceeds to step S28.

(S25) The replacement page determining unit 143 obtains a stream ID from the management structure pointed to by the pointer selected at step S23, and calculates the hash value of the stream ID. The replacement page determining unit 143 searches the hash table 132 for a linked list corresponding to the calculated hash value, and searches for a pointer pointing to the same management structure as the pointer selected at step S23. The replacement page determining unit 143 removes the found pointer.

(S26) The replacement page determining unit 143 determines whether another pointer is registered in the linked list found at step S25, that is, whether there is another pointer that corresponds to the same stream ID as the pointer removed at step S25. If another pointer is found, the process proceeds to step S28. If no other pointer is found, the process proceeds to step S27.

(S27) The replacement page determining unit 143 removes the entry including the stream ID obtained at step S25 from the sequence ID table 133.

(S28) The replacement page determining unit 143 determines whether it has returned as many pointers as the page count specified in the determination request. If the replacement page determining unit 143 has returned the specified number of pointers, this replacement page determination is completed; otherwise, the process proceeds back to step S21.

Figure 15:
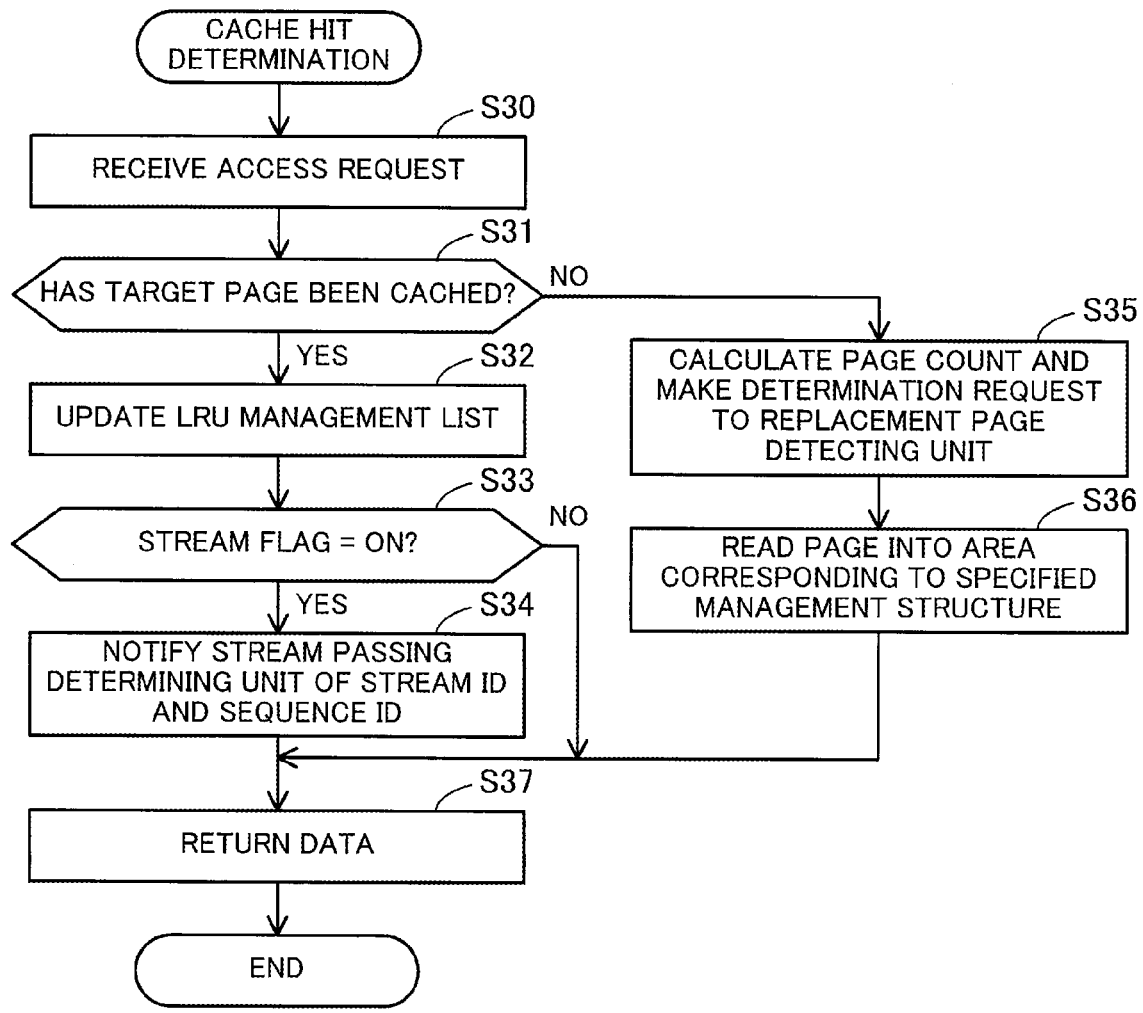
FIG. 15 is a flowchart illustrating an example of a procedure of cache hit determination.

FIG. 15 is a flowchart illustrating an example of a procedure of cache hit determination.

(S30) The cache hit determining unit 144 receives an access request including address information from the access request receiving unit 141. The address information includes, for example, a physical address of the HDD 103 indicating the beginning of data to be read, and a data length.

(S31) The cache hit determining unit 144 specifies one or more target pages on the basis of the address information included in the access request. The cache hit determining unit 144 determines based on the disk addresses included in management structures whether the specified target pages have been cached in the RAM 102. If the target pages have been cached (cache hit), the process proceeds to step S32. If the target pages have not been cached (cache miss), the process proceeds to step S35.

(S32) The cache hit determining unit 144 searches the LRU management list 134 for a pointer pointing to a management structure including the disk address of each target page, and moves the pointer to the top of the LRU management list. In this connection, in the case where another page replacement algorithm is employed, the cache hit determining unit 144 operates according to the employed algorithm.

(S33) The cache hit determining unit 144 obtains a stream flag from the management structure including the disk address of the target page. The cache hit determining unit 144 determines whether the stream flag is "ON". If the stream flag is "ON", the process proceeds to step S34. If the stream flag is "OFF", the process proceeds to step S37.

(S34) The cache hit determining unit 144 obtains the stream ID and sequence ID from the management structure including the disk address of the target page. The cache hit determining unit 144 notifies the stream passing determining unit 145 of the stream ID and sequence ID.

(S35) The cache hit determining unit 144 calculates the number of target pages specified at step S31, as a page count, and makes a determination request including the page count to the replacement page determining unit 143.

(S36) The cache hit determining unit 144 receives as many pointers of management structures as the page count calculated at step S35 from the replacement page determining unit 143. The cache hit determining unit 144 obtains the cache addresses from the management structures pointed to by the received pointers. The cache hit determining unit 144 copies the target pages from the HDD 103 to the areas of the RAM 102 indicated by the cache addresses. In addition, the cache hit determining unit 144 updates the stream ID, sequence ID, disk address, and stream flag of the management structure pointed to by each received pointer. As the stream ID and sequence ID, "NULL" or "0" is registered in the management structure. As the disk address, a physical address of the HDD 103 indicating the beginning of the target page is registered in the management structure. As the stream flag, "OFF" (or "0") is registered in the management structure.

(S37) The cache hit determining unit 144 extracts data identified by the address information included in the access request from the pages cached in the RAM 102, and returns the extracted data to the sender of the access request. In this connection, if the access request is a write request, the cache hit determining unit 144 updates the page cached in the RAM 102 using the data included in the write request, and notifies the sender of the access request of the success or failure of the update. When the cached page is updated, the page is written back to the HDD 103 immediately after the page is updated or when the page is evicted from the RAM 102.

Figure 16:
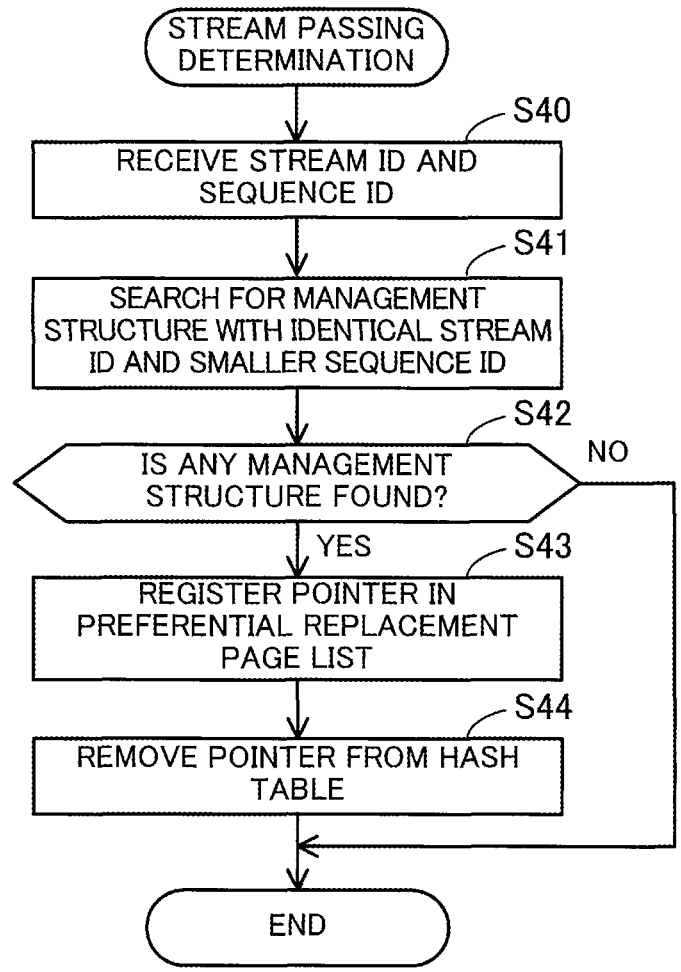
FIG. 16 is a flowchart illustrating an example of a procedure of stream passing determination.

FIG. 16 is a flowchart illustrating an example of a procedure of stream passing determination.

(S40) The stream passing determining unit 145 receives a notification of a stream ID and a sequence ID from the cache hit determining unit 144.

(S41) The stream passing determining unit 145 calculates the hash value of the received stream ID. The stream passing determining unit 145 searches the hash table 132 for the linked list corresponding to the calculated hash value. The stream passing determining unit 145 obtains the sequence IDs from the management structures pointed to by the pointers included in the linked list, and detects management structures each including a sequence ID smaller than the received sequence ID.

(S42) The stream passing determining unit 145 determines whether any management structure is found at step S41. If any management structure is found, the process proceeds to step S43. If no management structure is found, this stream passing determination is completed.

(S43) The stream passing determining unit 145 registers the pointers pointing to the management structures, found at step S41, in the preferential replacement page list 135.

(S44) The stream passing determining unit 145 removes the pointers pointing to the management structures, found at step S41, from the linked list found at step S41.

Figure 17:
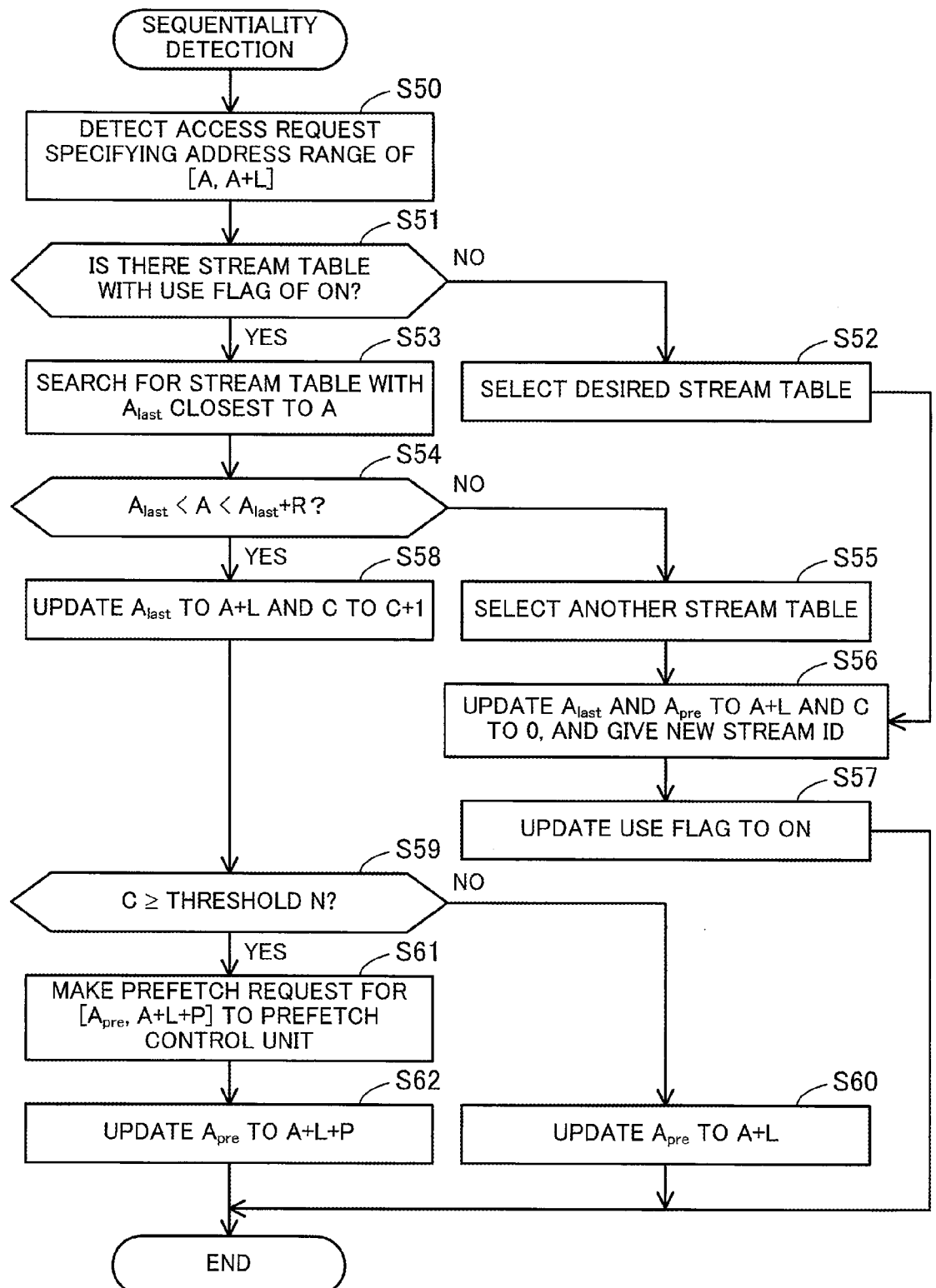
FIG. 17 is a flowchart illustrating an example of a procedure of sequentiality detection.

FIG. 17 is a flowchart illustrating an example of a procedure of sequentiality detection.

(S50) The sequentiality detecting unit 146 monitors access requests that are received by the access request receiving unit 141, and detects an access request specifying an address range of [A, A+L] (indicating a beginning physical address of A and a data length of L).

(S51) The sequentiality detecting unit 146 searches the stream table set 136 for stream tables with a use flag of "ON" (or "1"). The sequentiality detecting unit 146 determines whether any stream table is found. If any stream table is found, the process proceeds to step S53. If no stream table is found, the process proceeds to step S52.

(S52) The sequentiality detecting unit 146 selects a desired stream table from the stream table set 136. Then, the process proceeds to step S56.

(S53) The sequentiality detecting unit 146 searches the stream tables having the use flag of "ON" for a stream table with an access address ($A_{last}$) closest to A.

(S54) The sequentiality detecting unit 146 determines whether the access address ($A_{last}$) of the stream table found at step S53 satisfies $A_{last}<A<A_{last}+R$. "R" in this relationship is a threshold for intervals of access operations determined to have sequentiality as illustrated in FIG. 4, and is set in advance. If the relationship is satisfied, the process proceeds to step S58; otherwise, the process proceeds to step S55.

(S55) The sequentiality detecting unit 146 selects one stream table with the use flag of "OFF" (or "0") from the stream table set 136. If the stream table set 136 does not include any stream table with the use flag of "OFF", the sequentiality detecting unit 146 selects the stream table found at step S53.

(S56) The sequentiality detecting unit 146 updates the access address ($A_{last}$), prefetch address ($A_{pre}$) sequence counter (C), and stream ID of the stream table selected at step S52 or S55. As the access address and the prefetch address, the end (A+L) of the address range specified by the address request is registered. The sequence counter is initialized to "0". The stream ID is set to a new identification number.

(S57) The sequentiality detecting unit 146 updates the use flag of the selected stream table to "ON". Then, the sequentiality detection is completed.

(S58) The sequentiality detecting unit 146 selects the stream table found at step S53. The sequentiality detecting unit 146 updates the access address ($A_{last}$) and the sequence counter (C) of the selected stream table. As the access address, the end (A+L) of the address range specified by the address request is registered. With regard to the sequence counter, the current value is incremented to (C+1).

(S59) The sequentiality detecting unit 146 determines whether the sequence counter updated at step S58 is a threshold N or greater. The threshold N is for an access count allowing a set of access operations satisfying the relationship of step S54 to be determined as a stream. The threshold N is an integer of two or greater, and is set in advance. If a relationship of C N is satisfied, the process proceeds to step S61; otherwise, the process proceeds to step S60.

(S60) The sequentiality detecting unit 146 updates the prefetch address ($A_{pre}$) of the stream table selected at step S58 to the end (A+L) of the address range specified by the access request. Then, the sequentiality detection is completed.

(S61) The sequentiality detecting unit 146 makes a prefetch request to the prefetch control unit 142. The prefetch request includes the stream ID of the stream table selected at step S58. In addition, the prefetch request includes $A_{pre}$ as the beginning address of a set of pages to be prefetched, and "A+L+P" as the end address of the set of pages to be prefetched. "P" indicates the amount of data that is read at a time by prefetching, and is set in advance.

(S62) The sequentiality detecting unit 146 updates the prefetch address ($A_{pre}$) of the stream table selected at step S58 to the physical address (A+L+P) of the HDD 103 indicating the end of the prefetched page.

With the information processing apparatus 100 of the second embodiment, a stream ID identifying a stream and a sequence ID that is unique within the stream are associated with each prefetched page. Then, the pages cached in the RAM 102 are searched for pages passed over by the stream, on the basis of the stream ID and sequence IDs. Pages passed over by the stream have a low possibility of being used thereafter, so that these pages are removed from the RAM 102 more preferentially than pages selected by the LRU algorithm. This approach makes it possible to keep free area in the RAM 102 while holding the pages having a higher possibility of being used than pages passed over by the stream. Therefore, it is possible to improve the use efficiency of areas for caching, compared with the case of employing only the LRU algorithm.

In this connection, as described earlier, the information processing of the first embodiment may be implemented by the information processing apparatus 10 running a program. The information processing of the second embodiment may be implemented by the information processing apparatus 100 running a program.

A program may be recorded on a computer-readable recording medium (for example, the recording medium 113). As the recording medium, for example, a magnetic disk, an optical disc, a magneto-optical disk, a semiconductor memory, or the like may be used. Magnetic disks include FDs and HDDs. Optical discs include CDs, CD-Rs (Recordable), CD-RWs (Rewritable), DVD, DVD-Rs, and DVD-RWs. The program may be recorded on portable recording media that are then distributed. In this case, the program may be copied from a portable recording medium to another recording medium (for example, HDD 103).

According to one aspect, it is possible to improve the use efficiency of a memory used for caching in the case where prefetching is performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
    a memory that caches therein data blocks stored in a storage device; and
    a processor that performs a process including
        detecting a stream of access satisfying prescribed regularity conditions, based on a positional relationship on the storage device among a plurality of first data blocks accessed,
        generating stream information indicating the stream,
        associating sequence information with each of a plurality of second data blocks prefetched based on the stream information from the storage device to the memory, the sequence information representing a positional relationship on the storage device among the plurality of second data blocks,
        searching, when one of the plurality of second data blocks is accessed, the plurality of second data blocks for one or more other second data blocks that are determined to be earlier in an order of access made by the stream than the one second data block, based on the sequence information, and
        removing the one or more other second data blocks from the memory.

2. The information processing apparatus according to claim 1, wherein the removing of the one or more other second data blocks includes removing the one or more other second data blocks more preferentially than a third data block cached in the memory with a method other than prefetching based on the stream information.

3. The information processing apparatus according to claim 1, wherein the removing of the one or more other second data blocks includes removing a second data block to which the stream has skipped access.

4. The information processing apparatus according to claim 1,
    wherein the sequence information includes increasing sequence numbers, and
    wherein the searching for the one or more other second data blocks includes searching the plurality of second data blocks for second data blocks with smaller sequence numbers than the one second data block.

5. A cache control method comprising:
    detecting, by a processor, a stream of access satisfying prescribed regularity conditions, based on a positional relationship on a storage device among a plurality of first data blocks accessed, and generating stream information indicating the stream;
    associating, by the processor, sequence information with each of a plurality of second data blocks prefetched based on the stream information from the storage device to a memory, the sequence information representing a positional relationship on the storage device among the plurality of second data blocks;
    searching, by the processor, when one of the plurality of second data blocks is accessed, the plurality of second data blocks for one or more other second data blocks that are determined to be earlier in an order of access made by the stream than the one second data block, based on the sequence information; and
    removing, by the processor, the one or more other second data blocks from the memory.

6. A non-transitory computer-readable recording medium storing a computer program that causes a computer to perform a process comprising:

detecting a stream of access satisfying prescribed regularity conditions, based on a positional relationship on a storage device among a plurality of first data blocks accessed, and generating stream information indicating the stream;

associating sequence information with each of a plurality of second data blocks prefetched based on the stream information from the storage device to a memory, the sequence information representing a positional relationship on the storage device among the plurality of second data blocks;

searching, when one of the plurality of second data blocks is accessed, the plurality of second data blocks for one or more other second data blocks that are determined to be earlier in an order of access made by the stream than the one second data block, based on the sequence information; and removing the one or more other second data blocks from the memory.

* * * * *